United States Patent [19]

Takada

[11] 4,323,204
[45] Apr. 6, 1982

[54] BELT CLAMPS FOR VEHICLE PASSENGER RESTRAINT BELTS

[76] Inventor: Juichiro Takada, 3-12-1, Shinmachi Setagayaku, Tokyo, Japan

[21] Appl. No.: 107,161

[22] Filed: Dec. 26, 1979

Related U.S. Application Data

[63] Continuation-in-part of Ser. No. 21,634, Mar. 19, 1979, abandoned.

[30] Foreign Application Priority Data

May 15, 1978 [JP] Japan ................................ 53-63959
Jun. 8, 1978 [JP] Japan ............................... 53-077235

[51] Int. Cl.³ .................... A62B 35/02; B65H 75/48
[52] U.S. Cl. ............................... 242/107.2; 280/806; 297/479
[58] Field of Search ....... 242/107.2, 107.4 R–107.4 E; 280/801–803, 806–808; 297/468–480; 188/65.1–65.5

[56] References Cited

U.S. PATENT DOCUMENTS

| | | | |
|---|---|---|---|
| 3,486,792 | 12/1969 | Stoffel | 242/107.2 X |
| 3,494,571 | 2/1970 | Stoffel | 242/107.2 |
| 3,504,867 | 4/1970 | Stevenson | 242/107.2 |
| 3,847,434 | 11/1974 | Weman | 242/107.2 X |
| 4,120,466 | 10/1978 | Adomeit | 242/107.2 |

Primary Examiner—John M. Jillions
Attorney, Agent, or Firm—Brumbaugh, Graves, Donohue & Raymond

[57] ABSTRACT

A belt clamp for use in a vehicle passenger restraint belt system comprises a pair of jaws, one of which is movable relative to the other, such as by a lever, is normally held away from the other by a spring, and is moved toward the other in response to an abnormally high pull-out force on the belt to engage a restraint belt guided between the jaws. A multiplicity of spaced-apart, elongated straight teeth oriented widthwise of the belt and of uniform, smoothly curved cross section frictionally clamp the belt against pulling out by tucking loops of the belt into complementary recesses in the other jaw. Preferably, both jaws have substantially identical teeth and substantially identical recesses which are generally complementary to the teeth, the shapes of the teeth and recesses being such as to produce a smoothly corrugated clamping section in which several loops of the belt are formed and by which frictional holding forces are developed without any cutting or abrading of the belt. Advantageously, small variations in gripping faces of the jaws compensate for variations in the properties of the belt (e.g., thickness, density and elasticity) and for deformation of the jaws.

7 Claims, 25 Drawing Figures

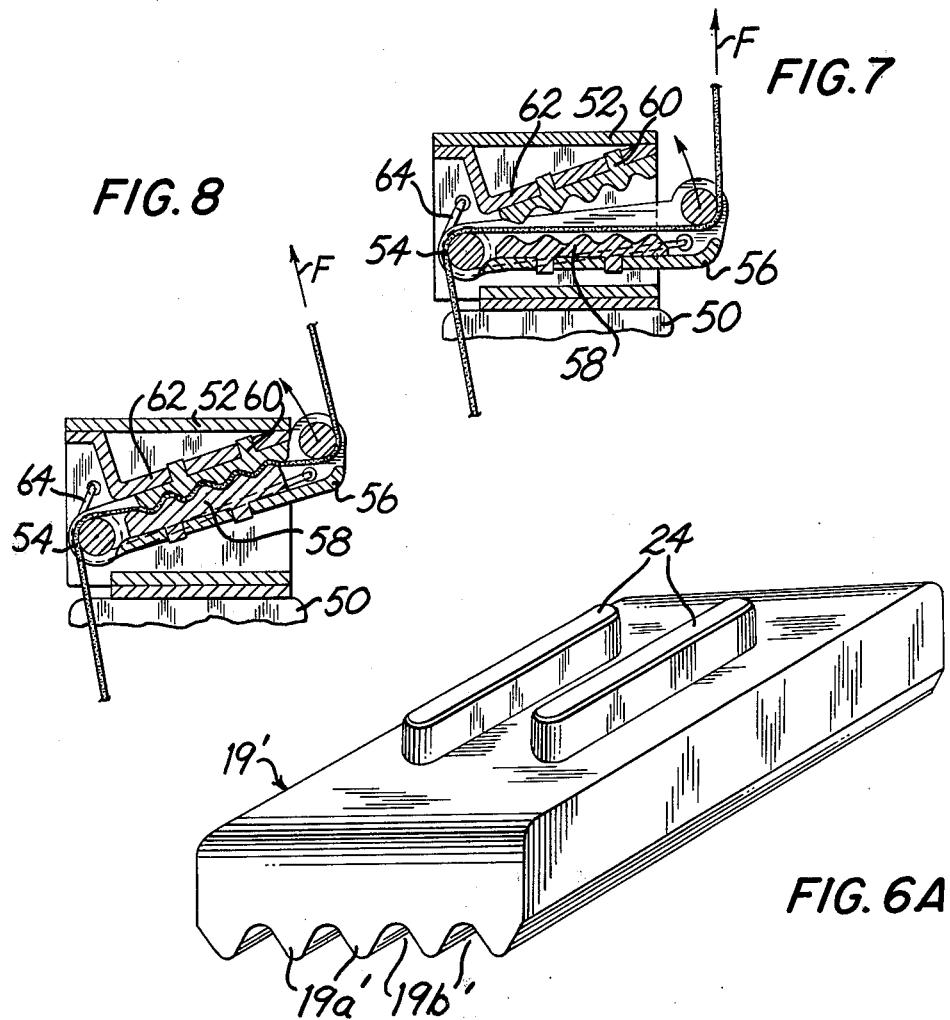
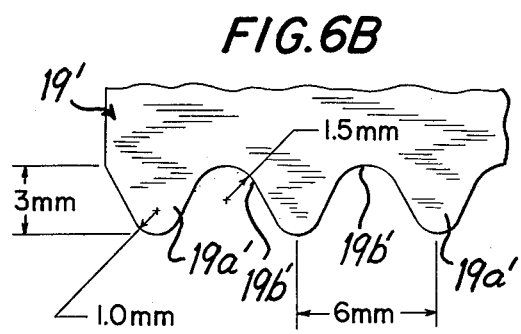

BELT CLAMPS FOR VEHICLE PASSENGER RESTRAINT BELTS

This application is a continuation-in-part of U.S. Appln. Ser. No. 21,634 filed Mar. 19, 1979 now abandoned.

FIELD OF THE INVENTION

The present invention relates to belt clamps for limiting the extent to which a vehicle occupant restraint belt is pulled from a retractor after the retractor reel becomes locked.

BACKGROUND OF THE INVENTION

Most vehicle seat belt retractors being manufactured currently are of the emergency locking type in which the reel onto which the belt is wound is locked against rotation automatically in response to a device which senses acceleration or deceleration of the vehicle, most commonly upon a collision or upset. Such retractors, though they are recognized to be generally reliable and effective in improving the safety of the vehicle occupant, have one disadvantage; even though the reel may lock reliably and promptly, some extension of the belt can nonetheless occur due to withdrawal of the belt from several loops which remain wound onto the reel, such loops usually being wound relatively loosely and being unwound from the reel by reason of tightening of the loops under the high force imposed on the belt in a collision. This problem has been recognized, and various ways have been proposed for solving it. Most of the proposed solutions involve one form or another of a belt clamping device in which some sort of movable belt-gripping element tightly engages and grips the belt in response to a high force imposed on the belt. Some types of gripping elements, such as curved gripping shoes or eccentric rollers having knurled or otherwise roughened surfaces, are very prone to allowing the belt to slip, inasmuch as the contact area is relatively small. Clamping bars which force the belt into a narrow slot or otherwise produce a sharp fold in the belt, often in conjunction with clamping the belt against a surface, sometimes produce a belt failure by cutting into the belt. It has also been proposed (see U.S. Pat. No. 4,120,466) to clamp a restraint belt between planar clamping surfaces, but it is open to question whether sufficient frictional surface area with a sufficiently high coefficient of friction can be provided in a device of a practical size which can function reliably over a long useful life.

SUMMARY OF THE INVENTION

There is provided, in accordance with the present invention, an improved belt clamp for use in vehicle passenger restraint belt systems which comprises a pair of gripping jaws, each of which is carried by a support member. At least one of the jaw support members is movable in response to a high pull-out force on the belt. The belt clamp is characterized in particular by effective clamping surfaces on the gripping jaws which present virtually no risk of allowing the belt to slip or contributing to belt failure. The belt clamp is intended for use in conjunction with a retractor onto and from which the belt is wound and unwound and can be located remotely from the retractor or can be integrated with the retractor on an integral or assembled frame.

In accordance with one aspect of the present invention, at least one of the jaws of the belt clamp has a multiplicity of closely spaced teeth which lie transversely to the direction of movement of the belt. Each tooth is straight, is of a length not less than the width of the belt, is smoothly curved in end profile and is of substantially uniform cross section along its length, except that small variations may be introduced with certain advantages, as described below. The other jaw has a multiplicity of recesses, each of which generally matches a corresponding tooth on the other jaw and receives such corresponding tooth and a widthwise strip of the belt upon engagement of the belt between the jaws, each such strip of the belt being formed into a smoothly curved loop by being tucked by a tooth into a recess. Preferably, each recess is a straight, elongated concavity having a shape generally complementary to that of the corresponding tooth of the first jaw such that each belt loop is frictionally clamped between the surfaces of each tooth and corresponding recesses upon engagement of the belt between the jaws. The jaws of the belt clamp may have identical gripping surfaces, each having straight, smoothly curved, transverse teeth alternating with generally complementary shaped recesses which receive the teeth on the other jaw. Alternatively, and in some cases, preferably, the gripping surfaces of the jaws differ from each other.

As mentioned above, the improved belt clamp, according to the present invention, grips the belt frictionally between the smoothly curved teeth and generally corresponding recesses. The gripping surfaces are engaged with the belt to develop frictional gripping forces by the force applied to the belt which, in turn, is imparted to the jaws by a lever or a wedge carrying at least one of the jaws. Accordingly, the greater the force on the belt, the greater the frictional force restraining the belt. An important advantage of the formation of loops in the belt section engaged by the clamping jaws is that any extension of the belt from the retractor is compensated for by the formation of loops between the jaws.

There are actually two modes of development of frictional forces at work when the jaws grip the belt. One mode occurs at each loop in the belt where it turns over the tip (or tips) of a tooth. The loop is pulled toward the tip of the tooth due to tension in the belt. There is actually a gradient in the belt tension along the length of the part of the belt between the jaws, because frictional forces dissipate the tension that exists at the outgoing end of the gripped segment so that the belt tension drops to zero somewhere along the gripped part. The increment of tension over each belt loop where it wraps a curved surface produces pressure and results in the development of friction between the jaw tooth and the belt loop.

The other mode of friction development results from pressure build up in the belt where it is squeezed between the gripping surface of the jaws. This mode can exist over all or only part of the total surface area of the jaws, depending on whether the belt is squeezed over the entire or over only part of the portion received between the jaws.

The extent to which each mode contributes to the total friction depends, of course, on the precise configuration of the gripping surfaces, but it also depends on many physical characteristics (e.g., stiffness, density, thickness, elasticity and so forth) of the belt and on the magnitude of the force on the belt. Also, the jaws may undergo deflection of sufficient magnitude to warrant taking it into account in the design of the gripping surfaces. It is apparent, therefore, that the mechanical phenomena occurring when the jaws grip the belt are highly complex. This means that the designing of the gripping surfaces is largely empirical.

It may suffice in some cases—i.e., with some belts and belt load curves—to have teeth and recesses of exactly uniform cross-sections along their lengths which mesh with a substantially uniform gap at a certain load on the belt. In most cases, however, it will be preferable to take several things into account in the design of the teeth and recesses of the jaws. One is the variation in belt thickness under squeezing pressure comparable to that occurring in the jaws. Generally, the selvages are thicker than the center of the belt. Accordingly, the gaps between the gripping surfaces when they grip the belt should be greater at the edges than in the center in order to even out the squeezing pressure across the belt width and avoid a dangerously high pressure anywhere in the gripped part.

The selvages are also usually less elastic than the center part, which may warrant varying the heights of the teeth along their lengths so that the lengths of belt gripped along the selvages are a little less than the length along the center, thereby evening out the tension across the width of the gripped portion. Deflection of the jaws can be compensated for by crowning the gripping surfaces. Some examples of various gripping surface configurations are shown in the drawings and described below.

Some guidelines for the design of the gripping surfaces of the jaws are:

1. The radii of the tips of the teeth should not be less than approximately equal to the belt thickness, lest the belt be looped too sharply and be too highly tensioned at the outside of the loop.

2. It is very difficult to adjust the radii of the tips of the teeth and the bases of the recesses to produce a uniform gap at a design gap of the engaged jaws at a design load, and the gap will vary at other than the design load anyway. It is best, therefore, not to provide squeezing at the curved (in profile) areas of the gripping surfaces.

3. The walls of the teeth and recesses should be surfaces generated by parallel lines oblique to the major plane of the jaw, so that at all locations transversely of the belt, the gap between the opposed walls which squeeze the belt is uniform. As mentioned above, the sizes of the gaps are selected along the width of the belt taking into account belt thickness and density variations (and other relevant physical characteristics of the belts) and any deflection of the clamp.

4. All changes in tooth and recess shape should be relatively smooth - sharp breaks which could produce high pressure zones and possible cutting or other local failure should be avoided.

5. The heights of the teeth should be from about two to about eight times the thickness of the belt.

The jaws can be used in various clamp devices. For example, on jaw can be fixed to a frame and the other jaw mounted on a lever arm pivoted at one end on the frame and having a roller at the other end around which the belt turns (after passing between the jaws) and then leads away in a direction to pull the lever and the jaw on the lever toward the fixed jaw. A spring holds the lever and movable jaw away from the belt when the belt is under moderate tension, e.g., the tension generated by the retractor and moderate pull-out forces.

In another embodiment one jaw is fixed and the other jaw is mounted on a movable support which has a wedge surface acted on by a translatable belt turning roll.

Both jaws can be mounted on a spring-loaded lever which is subject to belt tension. One jaw moves relative to the lever and the other jaw when it engages a fixed abutment on the frame upon movement of the lever in response to belt tension.

For a better understanding of the invention and a description of further preferred features, reference may be made to the following description of exemplary embodiments, taken in conjunction with the figures of the accompanying drawings.

DESCRIPTION OF THE DRAWINGS

FIG. 6A is a pictorial view of a preferred form of clamping jaw;

FIG. 6B is a fragmentary end cross-sectional view of a segment of a clamping jaw;

FIG. 7 is an end cross-sectional view of another embodiment of the belt clamp showing it in its normal disengaged position;

FIG. 8 is a view similar to FIG. 7 but showing the belt clamp engaged with the belt;

DESCRIPTION OF EXEMPLARY EMBODIMENTS

Figure 1:
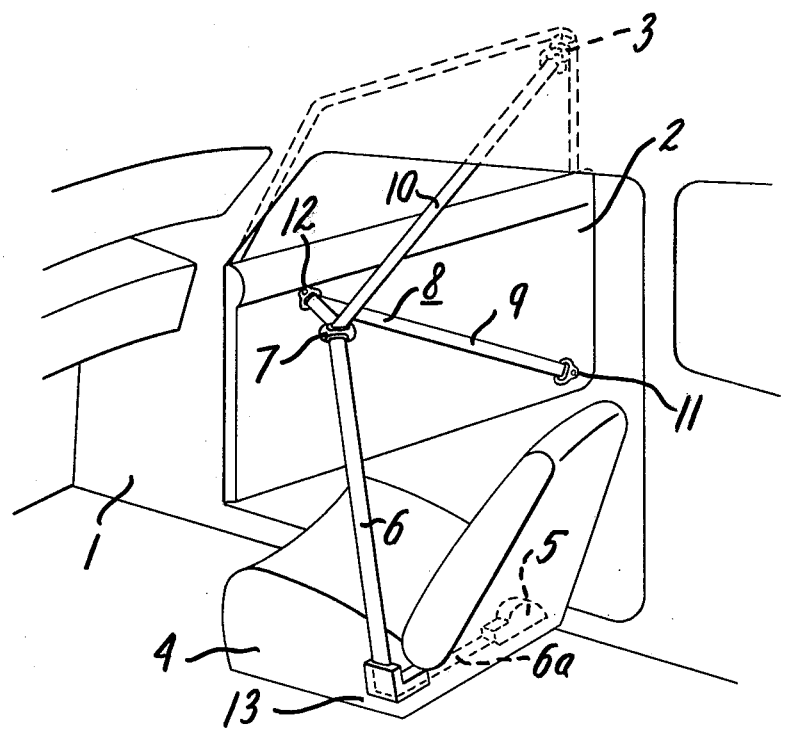
FIG. 1 is a pictorial view in generally schematic form of a passive restraint belt system in which a belt clamp, according to the invention, is useful.
Figure 2:
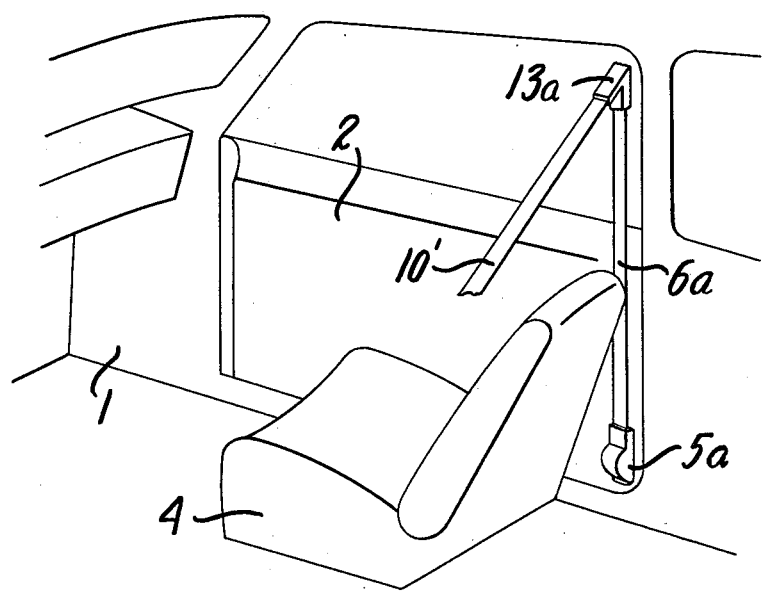
FIG. 2 is a pictorial view in schematic form of another restraint system employing a belt clamp.

Examples of the uses of belt clamps embodying the present invention are the passive restraint belt systems shown in FIGS. 1 and 2. The opportunity for restraint belts to lengthen significantly under the high force resulting when the passenger is propelled forward in a collision is generally greater in most passive systems than in non-passive belts because many loops of the belt are wound on the retractors when the belt system is in the restraining position, those loops being required to permit the belts to be pulled out when the system transfers to the releasing position.

The passive restraint belt system shown in FIG. 1 makes use of opening and closing movement of a door 2 of a vehicle 1 to transfer a belt between a releasing and a restraining configuration. One end of a continuous restraint belt is affixed by an anchor 3 to the upper rear corner of the door and leads from the anchor 3 through a control ring 7 and a movable transfer ring 12 to an anchor 11 on the lower rear corner of the door. The transfer ring 12 is movable diagnonally along a track 8 on the door by a suitable drive mechanism. A control belt 6 leads from the control ring 7 through a belt clamp 13 on the inboard side of the seat and to an emergency locking retractor 5 affixed under the vehicle seat 4. In the passenger-releasing position of the system, which is the configuration shown in FIG. 1, the transfer ring 12 pulls the belt toward the door by moving upwardly and forwardly along the track 8, and the retractor 5 releases a length of the control belt 6. When the door closes, the transfer guide moves downwardly and rearwardly along the track 8 to a position near the anchor 11, and the retractor 5 winds the control belt 6 in, thus pulling a lap belt portion 9 and a shoulder belt portion 10 of the restraint belt across the occupant when the control ring 7 moves to a position near the belt clamp 13.

The system shown in FIG. 2 employs a single belt 10' which leads from a retractor 5a mounted on the door to and through a belt clamp 13a affixed at the upper rear corner of the door and then laterally across the seat 4 to an anchor (not shown) on the inboard side of the seat. This type of passive system normally uses a knee bolster to restrain movement of the lower body of the passenger. When the door is opened, the length of belt is pulled from the retractor 5a, and the shoulder belt moves forward to release the passenger.

Figure 3:
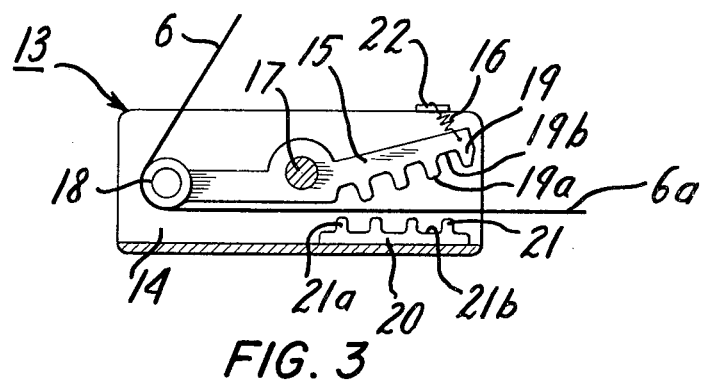
FIG. 3 is a side view in cross section of an embodiment of the belt clamp showing it in its normal disengaged configuration.
Figure 4:
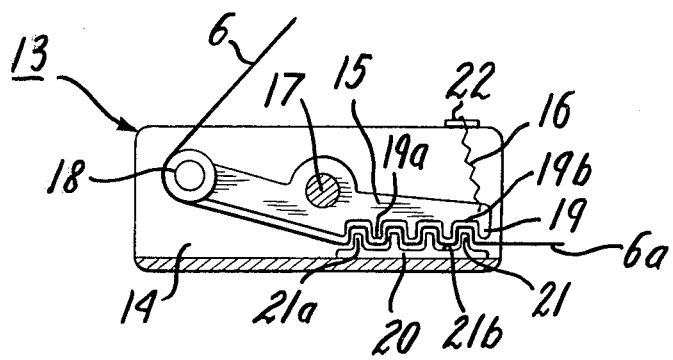
FIG. 4 is a side cross-sectional view similar to FIG. 3 but showing the clamp in engagement with the belt.

Each of the belt clamps 13 and 13a embodies the present invention, an example of which is shown in FIGS. 3 and 4. The belt clamp shown in FIGS. 3 and 4 comprises the generally U-shaped frame 14 having an axle 17 pivoted between the side walls. One clamping jaw 21 is formed on or affixed to the base 20 of the frame to one side of the axle 17. A second clamping jaw 19 is formed on or affixed to a lever 15 mounted on the axle 17. The incoming section 6a of the restraint or control belt as the case may be, is guided straight through the space between the clamping jaws 19 and 21, preferably in a manner such that there is normally no engagement between either jaw and the incoming section 6a. The belt then turns around a guide roller 18 on the lever and is led away (reference numeral 6) in a direction such that a force applied to the outgoing section and in excess of the force of a spring 16 fastened between a bar 22 on the frame and the lever pivots the lever about the axis of the axle to engage the incoming section 6a of the belt between the jaws 19 and 21. The force of the spring 16 is sufficient to keep the lever from pivoting when a normal force, such as that required to pull the belt between the releasing and restraining positions, is applied, but insufficient to resist the high force exerted on the belt in an emergency situation when the passenger is propelled forward.

Each of the jaws 19 and 21 is composed of a series of teeth 19a and 21a separated by recesses 19b and 21b. Each tooth of each clamping jaw extends straight in a transverse direction, relative to the incoming path of the belt, is relatively smoothly curved in end profile and is of uniform cross section along its length. The teeth of the clamp shown in FIGS. 3 and 4 are generally rectangular in profile with rounded corners to provide the generally smooth curvature. Each recess has a shape generally complementary to that of a corresponding tooth of the other jaw but is somewhat larger in size to provide space between each tooth and recess for reception of the belt. When the jaws are closed (FIG. 4) under an abnormally high tension applied by the outgoing section of the belt, each tooth forms a small transverse loop in a section of the belt, and the belt is frictionally engaged by the surface of each tooth and the corresponding recess. The formation of a series of loops in the belt takes up a significant part or all of the extra length of belt that might otherwise be pulled from the retractor and ensures a minimum of elongation of the restraint portion of the restraint or control belt.

The teeth and recesses of the clamping jaws may be of various specific shapes and sizes, provided that certain requirements are fulfilled. For example, the side walls of each tooth and recess can be parallel or oblique to the plane of the belt, the side walls of the tooth being tapered toward each other in a direction toward the belt in the latter case. In all cases, there should be no sharp corners anywhere along the gripping surfaces of the jaws so that there will be no danger of the belt being cut into and severed. Similarly, the recesses should be slightly larger than the teeth to allow space for the belt when the jaws are closed, but the spacing between the clamping surfaces of the jaws should generally be less than the thickness of the belt to ensure development of friction over a substantial area of the clamped portion of the belt; the friction generated between the belt and the clamping surfaces of the jaws should not be less than the minimum tensile strength of the belt to ensure that the clamp is not a weak part of the restraint system. To this end, the teeth of each jaw should be of a height of from about two to eight times the thickness of the belt. On the other hand, the total contact area of each jaw should not exceed about 950 mm$^2$ in order to avoid the risk of belt failure.

Figure 5:
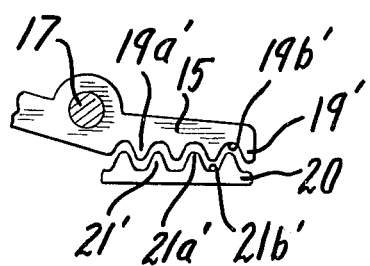
FIG. 5 is a fragmentary view showing clamping jaws of slightly different configuration from those of the clamp shown in FIGS. 3 and 4.

FIGS. 5, 6A and 6B show clamping jaws 19' and 21' that have been found to be highly effective with belts having thicknesses in the range of from about 1.2 to about 1.6 mm. The shapes and sizes of the teeth 19a' and 21a' and recesses 19b' and 21b' of the two jaws of the clamp are identical. Each jaw 19' or 21' has teeth 3.0 mm in height and spaced uniformly at a 6.0 mm pitch distance. The tips of the teeth are arcuate (radius 1.0 mm), the bases of the recesses are likewise arcuate (radius 1.5 mm), and the walls of the teeth and recesses are flat and tangent to the radii. The clamping jaw shown in FIGS. 6A and 6B is a separate piece having a pair of mounting lugs 24 which are received in matching slots in a support element of the clamp and compressed to provide a force fit.

The embodiment shown in FIGS. 7 and 8 is a complete belt clamp unit suitable for assembly with an emergency locking retractor 50 or attachment to some component of the vehicle. The embodiment comprises a generally tubular frame 52 carrying a first guide roller 54 which also serves as an axle carrying a generally U-shaped lever 56. The belt leads in any suitable direction to and around the guide roller 54, passes between a clamping jaw 58 (see also FIGS. 6A and 6B) affixed to the lever 56 and a jaw 60 fastened by a bracket 62 to the frame 52. The mouse-trap type spring 64 normally holds the lever 56 in a position in which both clamping jaws are free of engagement with the belt but yields to an abnormally high pull-out force represented by the arrowed line F which pivots the lever in a direction indicated by the arrowed line in FIG. 7 to clamp the belt between the jaws, as shown in FIG. 8. As long as the abnormally high force persists, the clamp continues to grip the belt, but when the force returns to normal, the spring 64 restores the clamp to the non-gripping configuration shown in FIG. 7.

Figure 9:
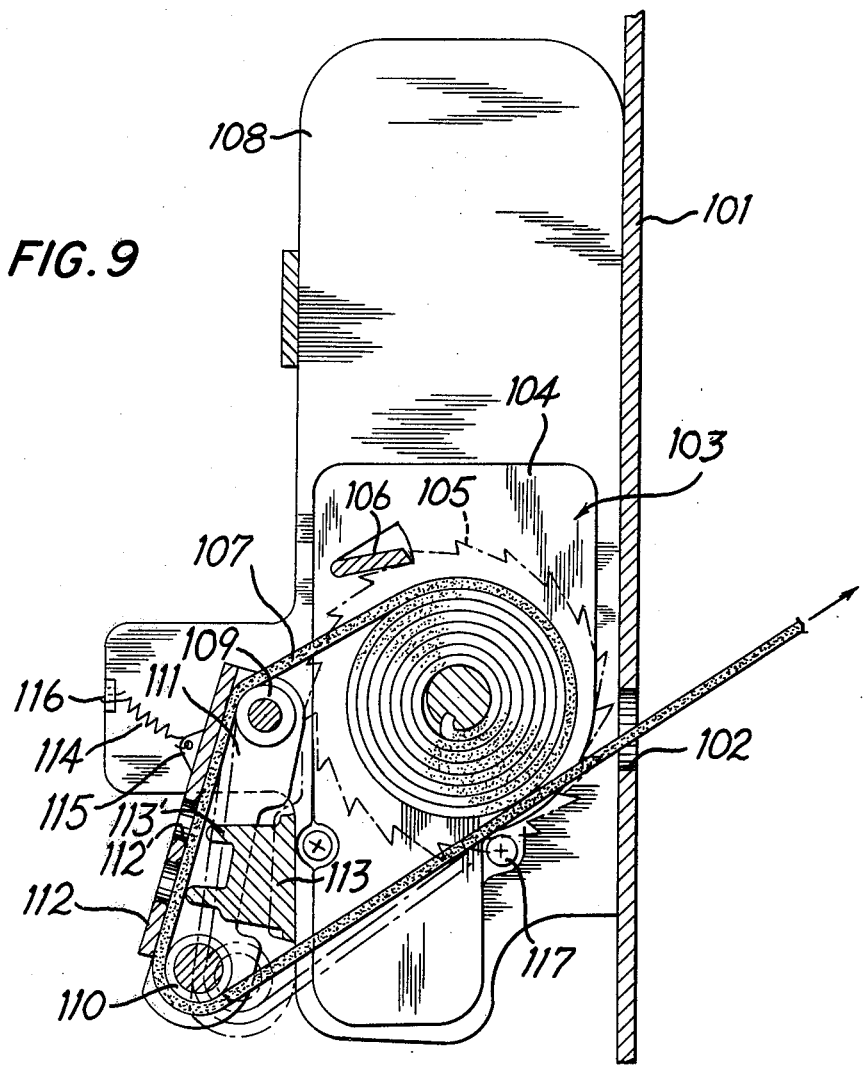
FIG. 9 is a side cross-sectional view of a belt retractor having another embodiment of belt clamp directly associated therewith.

The belt clamps shown in FIGS. 3 and 4 and described above and shown in typical belt systems in FIGS. 1 and 2 are independent of the emergency locking retractor. Separate belt clamps can find various uses and have the advantage of conserving space; however, the belt clamps may be integrated with an emergency locking retractor in various ways. FIG. 9 shows a retractor having an integrated belt clamp in a configuration suitable for mounting between the outer and inner panels of a vehicle door. The emergency locking retractor 103 is mounted on the inside door panel 101 by fastening it to a reinforcing plate 108 with screws 117. The retractor comprises a frame having side plates 104 which rotatably support a retractor reel which is connected to a locking ratchet wheel 105. The retractor reel has a winding spring (not shown) which takes in the belt but allows the belt to be pulled from the reel in the direction indicated by the arrow out through an opening 102 in the door panel and freely permits the belt to be rewound on the reel and held under tension. In an emergency, a device, such as a pendulum actuating mechanism which senses high acceleration or deceleration, causes a locking pawl 106 to engage the ratchet 105 and lock the reel against pull out of the belt.

The belt is taken off the reel along a path 107 and is led around a rotatable guide roller 109 mounted between the side flanges of a generally U-shaped level 111. The lever is rotatable about the axis of the roller 109, the roller axle being suitably attached to the frame of the retractor or to stiffener plates within the door. The belt leads from the roller 109 along the base of the lever to a second guide roller 110 and then turns the roller and passes out through the door opening 102. A spring 114 attached to a lug 115 on the lever and a frame element 116 holds the lever in the position shown in solid lines in FIG. 9 against normal pulling forces on the belt but yields under abnormal high forces on the belt to pull the lever toward a clamping jaw 113 mounted on the reinforcing side plates 108. The clamping jaw 113 has teeth 113' which press small loops into recesses in the form of slots 112' in the base of the lever 111, the base portion 112 of the lever thus constituting one clamping jaw of the belt clamp. Thus, the belt is frictionally clamped between the jaws 112 and 113 and prevented from being pulled out even though the emergency locking retractor 103 contains many relatively loose turns of the belt which would otherwise be pulled from the reel and result in lengthening of the belt.

Figure 10:
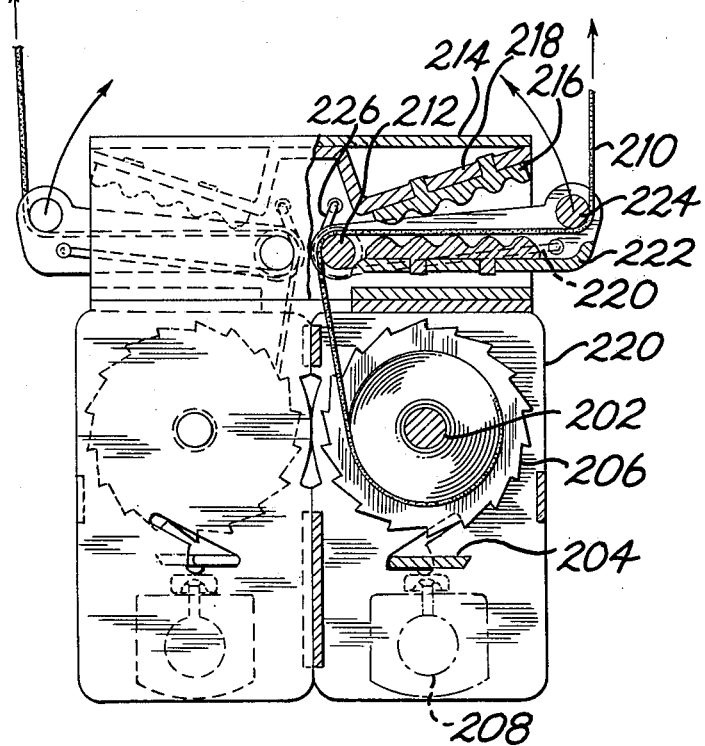
FIG. 10 is an end view of a pair of side by side retractors, each of which is associated with a belt clamp, part of the retractor and clamp assembly being broken away in cross section.

FIG. 10 illustrates a pair of emergency locking retractors mounted side by side and suitable for installation between separate driver and passenger seats in an automobile or other vehicle. Each retractor 200 has a belt reel 202 which can be locked against rotation (in a direction such that the belt is pulled from the reel) by engagement of a pawl 204 with a ratchet wheel 206 connected to the reel. The pawl 204 is actuated by a pendulum 208. The restraint belt 210 leads upwardly from the reel and around a guide roller 212 mounted between the side walls of a generally tubular belt clamp frame 214, then leads laterally between a fixed clamping jaw 216 mounted on a bracket 218 attached to the top wall of the frame 214 and a movable clamping jaw 220 carried by a lever 222 mounted to pivot on the axis of the roller 212. The belt then turns around a second guide roller 224 and leads away from the lever in a direction to pivot it about the pivot axis against the restraining force of a spring 226. The operation of the belt clamp is readily apparent from the foregoing description.

Figure 11:
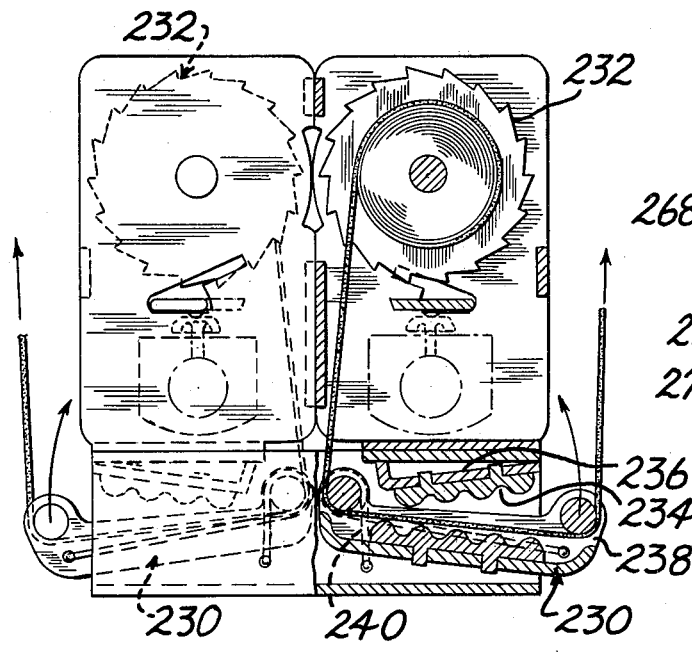
FIG. 11 is an end elevational view partly broken away in section, showing another embodiment of belt clamp built into a tandem assembly of retractors.

The tandem retractor and belt clamp assembly shown in FIG. 11 is very similar to the one shown in FIG. 10 and involves, in essence, relocating the belt clamps 230 to positions below the retractors 232 and some relatively minor changes in the detailed designs of the belt clamps. For example, the fixed jaw 234 is carried by a bracket 236 of slightly different form, the lever 238 is modified and the shape and manner of installation of the spring 240 differ somewhat from that of FIG. 1. The similarities and differences are apparent from the drawings, and the operation is clearly apparent from the above description.

Figure 12:
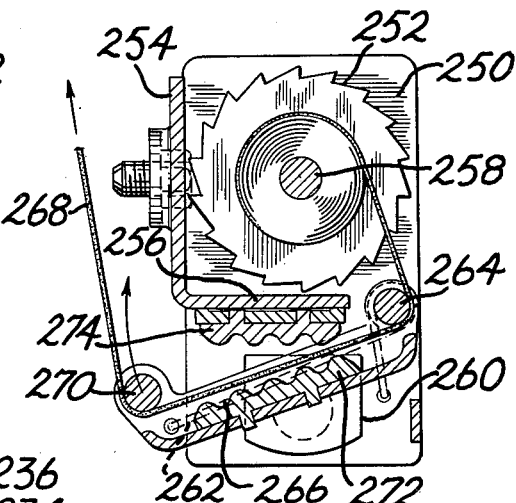
FIG. 12 is an end cross-sectional view of another retractor and belt clamp assembly.

The retractor and belt clamp shown in FIG. 12 comprises a frame 250 made by stamping out and shaping a blank to provide side members 252 and a base part 254 having an inturned transverse arm portion 256 on which the fixed clamping jaw 274 is mounted. The belt reel 258 is mounted between the side frame portions 252 and is lockable against belt pull-out by a pendulum and pawl mechanism 260. A lever 262 is mounted to pivot about a first guide roller 264 and is urged into the position shown in the drawing by a spring 266. The belt 268 leads from the belt reel 258 around the first guide roller 264 to a second guide roller 270 on the lever 262. In the event of an abnormally high pull-out force, the lever 252 is pivoted about the first guide roller 264 to engage the belt between the clamping jaw 272 on the lever 262 and the fixed clamping jaw 274 on the arm 256.

Figure 13:
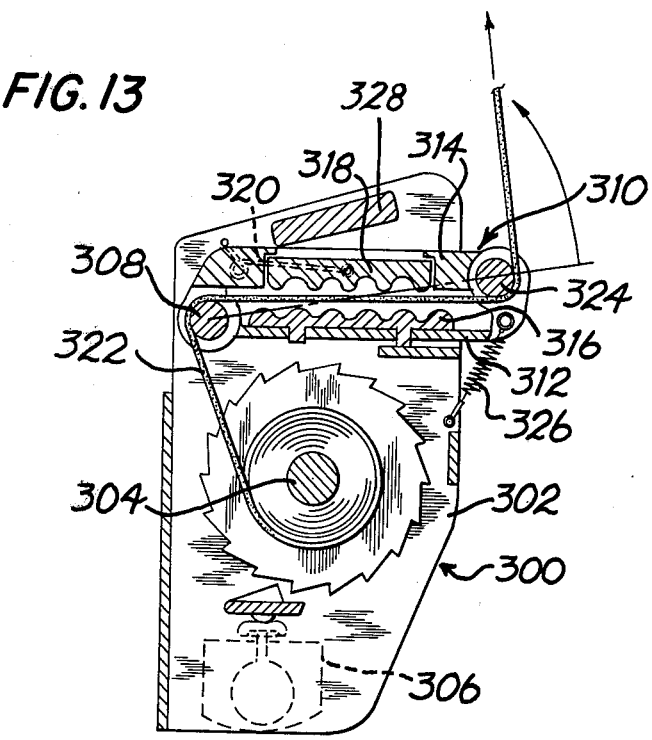
FIG. 13 is an end cross-sectional view of a retractor having another embodiment of belt clamp associated therewith, the belt clamp being shown in its normal disengaged configuration.
Figure 14:
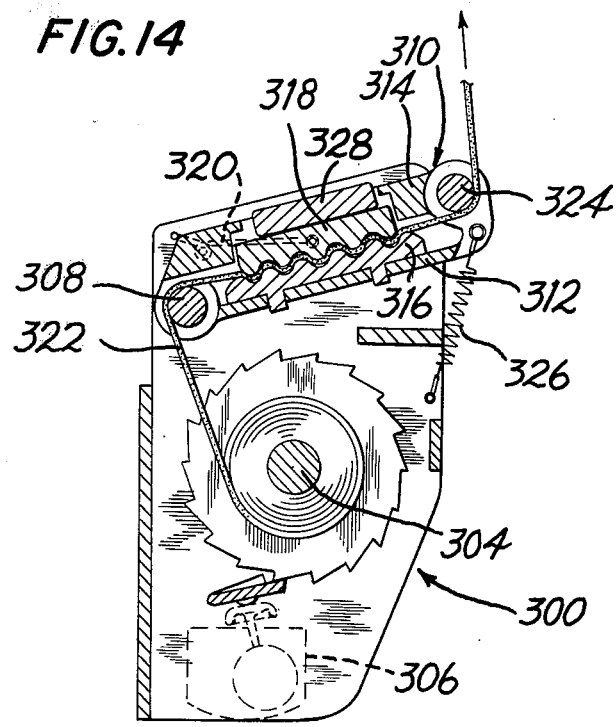
FIG. 14 is an end cross-sectional view of the retractor and belt clamp of FIG. 13 showing the belt clamped.

The emergency locking retractor and belt clamp assembly shown in FIGS. 13 and 14 comprises a frame 300, the end plates 302 of which support the belt reel 304, the pendulum and pawl locking mechanism 306 and the first guide roller 308 on which the lever 310 is pivoted. The lever includes a pair of spaced apart mounting plates 312 and 314. One jaw 316 of the clamp is affixed to the plate 312, and the other jaw 318 is received in an opening in the second plate 314 and is normally held in an upward position in the opening by a spring 320. The belt 322 leads from the reel around the first guide roller 308, passes between the clamping jaws and then turns around and leads up from a second guide roller 324. A spring 326 restrains the lever against pivoting in response to normal pull-out forces on the belt (FIG. 13) but yields to abnormally high pull-out forces on the belt such that the lever pivots up to bring the jaw 318 into engagement with a fixed abutment 328 attached between the side parts 302 of the frame. Such engagement causes the jaw 318 to be shifted against the holding spring 320, thus to clamp the belt frictionally between the gripping surfaces of the jaws 316 and 318.

Figure 15:
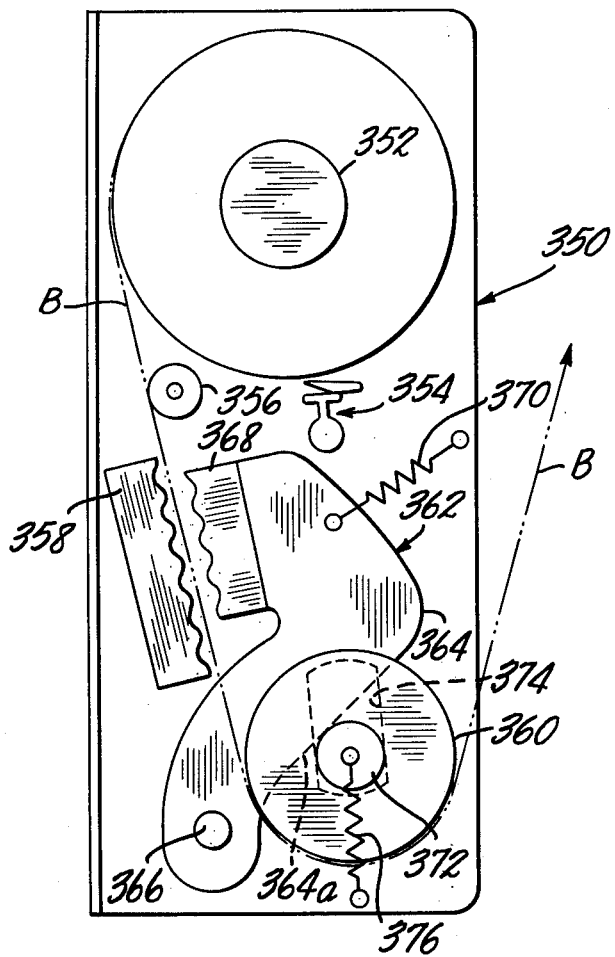
FIGS. 15 and 16 are side elevational views in generally schematic form showing another embodiment of a belt clamp, according to the present invention, in the disengaged and engaged positions, respectively.
Figure 16:
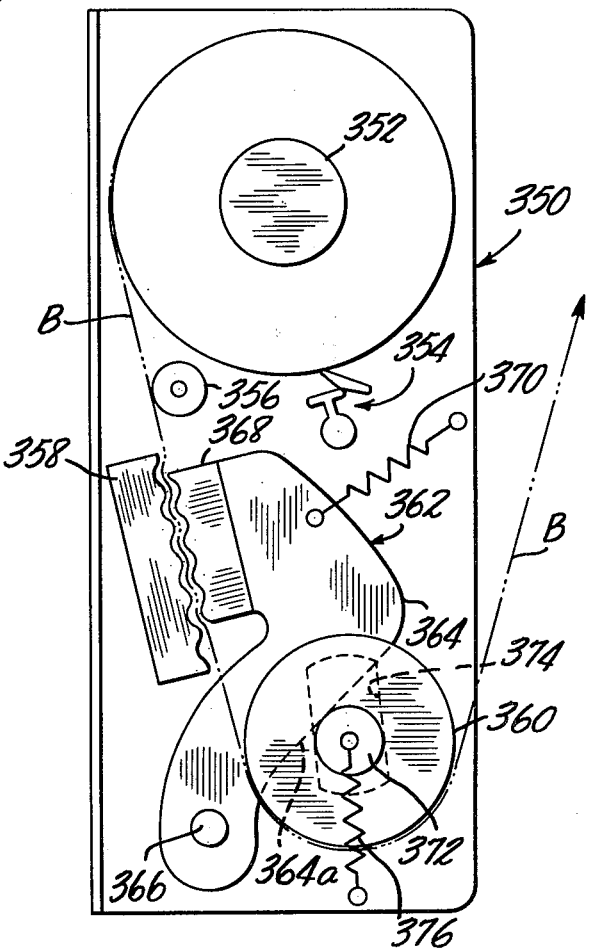

FIGS. 15 and 16 illustrate another embodiment of the belt clamp, according to the invention, which is built into an assembly with an emergency locking retractor on a generally U-shaped frame 350. The retractor (shown schematically) includes a belt reel 352 and a pendulum and pawl locking mechanism 354 which locks the reel automatically in response to acceleration of the vehicle. The belt B leads from the reel 352 over a first guide roller 356, then along a path closely adjacent, but not touching, the teeth of a fixed clamp member 358 mounted between the side plates of the frame 350 to and around a second guide roller 360, and away from the guide roller 360 in a direction generally opposed to the direction from which it is taken from the reel 352. A generally U-shaped lever 362, which includes a pair of spaced apart arms 364 located on either side of the belt and joined to the frame side plates by a pivot pin 366, supports a movable clamping jaw 368. The lever arm 362 is urged in a direction to hold the movable clamping jaw 368 away from the fixed clamping jaw 358 by a spring or springs 370.

The guide roller 360 includes shaft portions 372 which extend out from either end, are received in slots 374 in the side plates of the frame 350, and bear against the edges 364(a) of the lever arms 364. The edges 364(a) lie oblique to the path of the belt B between the guide rollers 356 and 360, and the guide slots 374 for the shafts 372 of the guide roll 360 lie oblique to the edges 364(a). A spring (or springs) 376 normally urges the guide roller in a direction away from the lever 362. The forces of the springs 370 and 376 act on the roller 360 in a direction against a pull-out force applied to the belt B and resiliently oppose movement of the roller and the lever arm (in the manner described below) under normal pull-out forces on the belt, "normal" referring to the forces which the user exerts on the belt in the process of applying it or the forces which are applied in the operation of a passive belt system.

When a large force is abruptly applied to the belt B, or when any force in excess of the resultant of the spring forces acting in a direction aligned with the slots 374, is applied with the belt reel 352 locked by the inertia-responsive or other locking mechanism of the retractor component of the assembly, the guide roll 360 is shifted along the guide slots 374 in a direction toward the lever 362, and the shaft portions 372 of the guide reel work against the edges 364(a) of the lever arm 364 and pivot the lever about the pivot pin 366 in a direction to move the movable clamping member 368 toward the fixed clamping member 358 and ultimately clamp the belt B between the clamping faces of the clamping members, as shown in FIG. 16. The greater the pull-out force on the belt, the greater is the force applied by the shafts 372 to the lever arm 364, and the greater is the clamping force which holds the belt against withdrawal from the reel 352. When the pull-out force is removed from the belt, the springs 370 and 376 restore the belt clamp to the release configuration shown in FIG. 15.

Figure 17:
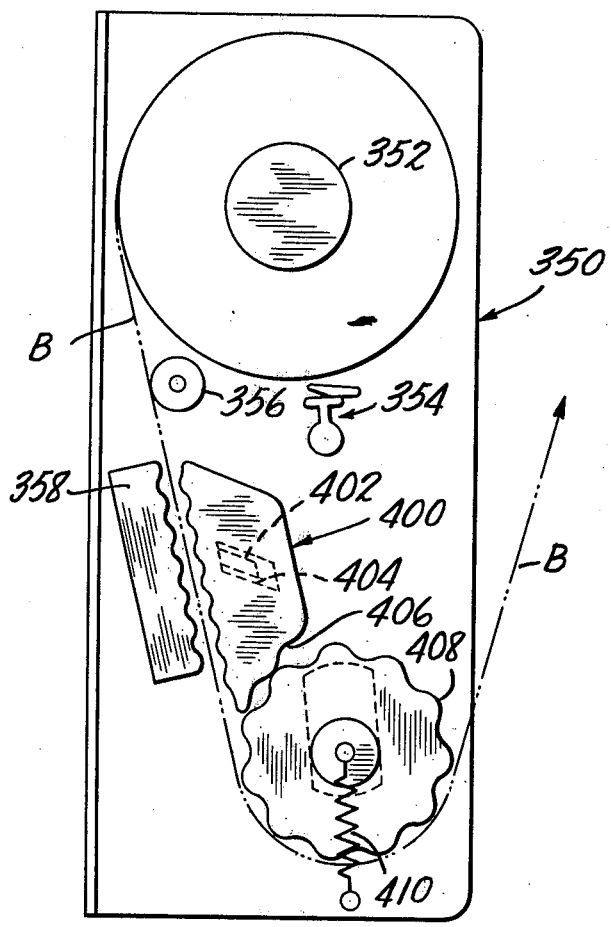
FIGS. 17 and 18 are also elevational views of another embodiment of the invention, the views being generally schematic and showing the belt clamp in the disengaged and engaged positions, respectively.
Figure 18:
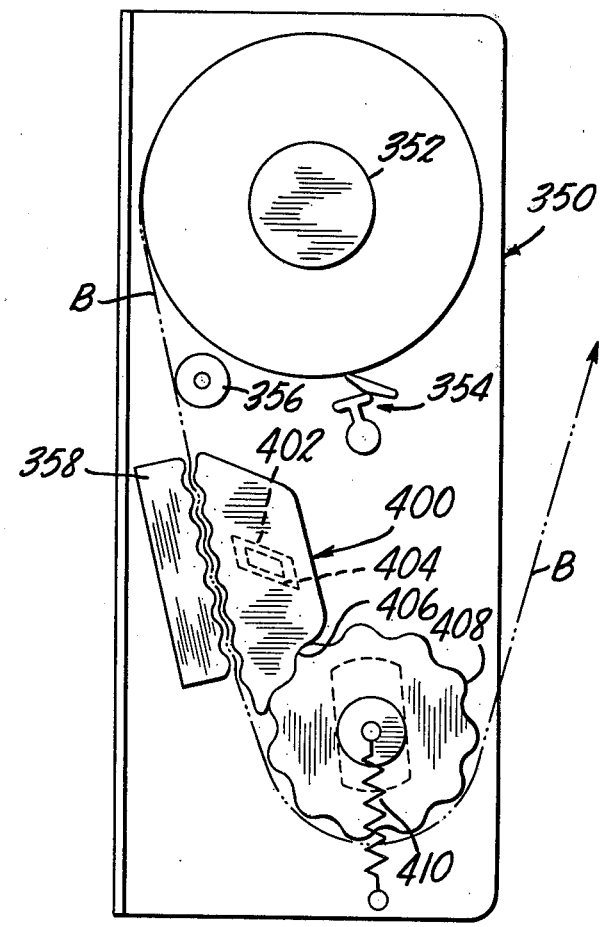

FIGS. 17 and 18 illustrate an emergency locking retractor and belt clamp assembly which is quite similar to the one shown in FIGS. 15 and 16. Accordingly, the elements of the embodiment of FIGS. 17 and 18 which are substantially the same as those of FIGS. 15 and 16 are assigned the same reference numerals and are not redescribed. The principal differences between the two embodiments are as follows:

Instead of a lever arm carrying a movable clamp member, there is a movable clamp member 400 which has guide lugs 402 extending out from either side that are received in guide slots 404 in the side members of the frame 350. The clamp member 400 normally is held close to, but out of engagement with, the belt B by gravity. A camming surface 406 on the guide member lies oblique to the path of the belt between the clamp members and is engageable by a guide roller 408 which corresponds to the guide 360 of the embodiment of FIGS. 15 and 16 but differs in that it has a corrugated surface. The surface 406 of the clamp member 400 has corrugations generally matching the corrugations of the surface of the guide roller 408. As shown in FIG. 18, the corrugations ensure better engagement between the guide roller and the clamp member and enhance the clamping action. As is apparent from the above description of FIGS. 15 and 16 and from a comparison of FIGS. 17 and 18, when the belt reel is locked and a force is applied to the belt of a magnitude sufficient to overcome the force of the spring or springs 410 associated with the guide roller 408, the guide roller 408 is pulled toward the clamping member 400, the corrugated surfaces of the roll 408 and the clamping member 400 engage, and the roll pushes the movable clamping member obliquely toward and into engagement with the belt and clamps the belt against the fixed clamping member. When the force on the belt is removed, the spring 410 pulls the guide roller 408 back to the release position, and the clamp member falls back along the guide slots 404 to the normal position (FIG. 17) out of engagement with the belt B.

Figure 19A:
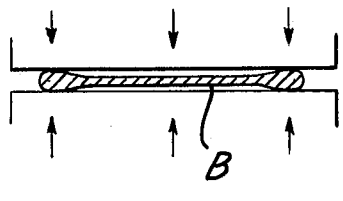
FIGS. 19A and 19B are diagrams illustrating two conditions that should be taken into account in the design of the clamping members.

Although both clamping members of any of the belt clamps described above may have matching teeth and recesses of uniform cross-section along the width, thus to define a space of uniform thickness and of corrugated configuration over the entire area which engages the belt, there are two important characteristics of the belt and the belt clamp structure which are, preferably, taken into account in the design of the clamping surfaces. One of them, as illustrated in FIG. 19(A) is a lack of uniform thickness across the width of the belt. Most webbing materials used for vehicle occupant restraint belts have greater thicknesses along the selvage edges at either side than in the center portion. If, as depicted in FIG. 19A, the gap between the clamping surfaces of the clamp members is of uniform width across the width of the belt, the edges of the belt B are subjected to substantially higher pressures than the center portion of the belt, thus creating a greater risk of damage to the belt or possibly even rupture. A related aspect of the physical properties of webbings commonly used in seat belts is variable elasticity, the selvage edges of most webbings being somewhat less elastic than the center portion.

Figure 19B:
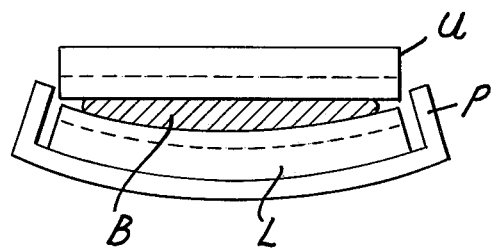

A characteristic of the belt clamp that should be considered in the design of the clamping members, as shown in FIG. 19B, is the possibility of deflection of the clamp member. In the example shown in FIG. 19B the upper clamp member U may be of the type shown, for example, in FIGS. 13 and 14 in which the backup member is relatively stiff and, together with the clamp member U, resists deformation in the transverse direction, whereas the moveable clamp member L is carried by a generally U-shaped plate P and is subject to transverse deformation.

Figure 20:
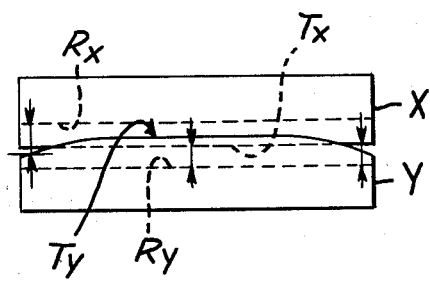
FIGS. 20 through 23 illustrate different ways of designing the clamping member to offset the conditions illustrated in FIGS. 19A and 19B.

The characteristics depicted in FIGS. 19A and 19B, can be compensated for in the design of the clamping surfaces of the clamping members in a number of ways, some of which are illustrated in FIGS. 20 to 23. As shown in FIG. 20, one clamping member X has teeth $T_x$ and recesses $R_x$, each of which is of uniform profile entirely across the width of the clamping member. The other clamping member Y has recesses $R_y$ of uniform profile along the width of the member and teeth $T_y$ which are higher in the center portion and curve down in regions corresponding generally to the selvage portions of the belt B. The reduced heights of the teeth of the member Y along the side portions provide gaps between the teeth of the member Y and the recesses of the member X of greater width than the gaps between the teeth and recesses of the members in the center portion. Accordingly, the selvage portions are under lesser average pressure as compared to the situation depicted in FIG. 19A, and the example shown in FIG. 20 provides more uniform distribution of clamping pressure across the width of the clamping surfaces. Moreover, the axis of the belt along the edge portions when the belt is clamped between the members X and Y is of lesser length because the small loops in the belt selvages where they pass over the side portions of the teeth $T_Y$ of the member Y are of lesser length than the loops over the teeth $T_Y$ at the center. The configuration of the teeth of the member Y shown in FIG. 20 also tends to compensate for deformation of the clamp member Y (see FIG. 19B).

Figure 21:
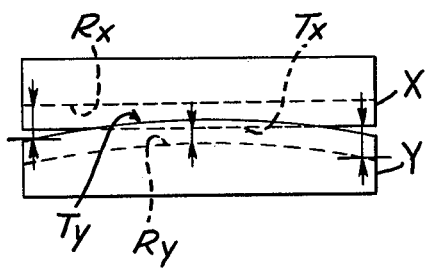

In the example shown in FIG. 21, the upper clamping member X has teeth $T_X$ and recesses $R_X$ that are straight and of uniform profile along the width. The other clamping member Y has teeth $T_Y$ and recesses $R_Y$ which are cambered (uniformly convexly curved in the upward direction) so that the gaps between the teeth of X and the recesses of Y and between the teeth of Y and the recesses of X are greater at the edges that at the center. When the clamping members of X and Y are loaded, i.e., when the belt is clamped between them, deformation of the clamping member Y (see FIG. 19B) tends to make the gaps between the teeth and recesses uniform, thereby evening out the average pressure on the belt across the width of the clamping surfaces.

Figure 22:
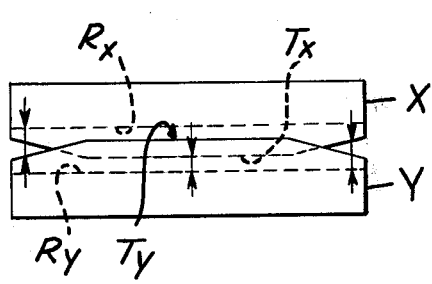

FIG. 22 illustrates a variation of the concept shown in FIG. 20 in that the teeth $T_X$ and the teeth $T_Y$ of both clamp members X and Y are of lesser heights along the side portions than in the center portions. This design compensates for greater belt thickness along the selvage edges, or for reduced elasticity along the selvage edges, or both.

Figure 23:
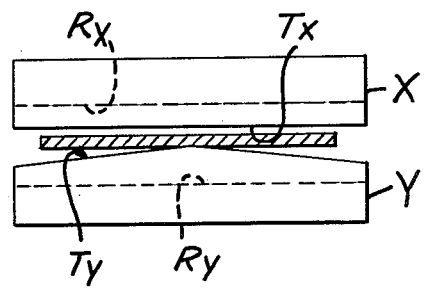

In the example shown in FIG. 23, the clamping member X has teeth and recesses that are straight and of uniform profile entirely across the width, and the clamping member Y has straight recesses $R_Y$ and teeth $T_Y$ of maximum height at the center and of uniformly decreasing height moving in either direction from the center toward either side. Both clamping member deformation and the variable belt characteristics shown in FIGS. 19B and 19A are compensated for when the belt is clamped between the clamping members.

The above-described examples of configurations of the clamping surfaces to compensate for characteristics of the belt and of the clamping members and their supports are merely representative, as are the guidelines set forth in the summary section. In each case, the amounts of variations in the teeth and recess heights are greatly exaggerated in the drawings to show the concept more clearly.

Thus, there is provided, in accordance with the present invention, a belt clamp in which, preferably, the belt can move freely between the jaws without engaging the clamping surfaces under normal force, but which is engaged evenly between smoothly curved gripping surfaces of a pair of jaws which are shaped to form a series of small loops and take up some or all of the length of the belt released by a locking retractor and frictionally hold the belt against being pulled out. The clamp produces little wear on the belt in either normal use or in emergency locking conditions.

The above described embodiments of the invention are merely exemplary, and numerous variations and modifications of the embodiments will be readily apparent to those skilled in the art without departing from the spirit and scope of the invention. All such variations and modifications are intended to be included in the scope of the invention, as defined in the appended claims.

I claim:

1. A belt clamp for a vehicle occupant restraint system which includes a restraint belt and a belt retractor onto and from which the belt is selectively wound and unwound and having a pair of jaws, one on either side of the belt, mounted on a lever which is mounted to pivot about an axis spaced apart from the jaws, one of the jaws being mounted on the lever for movement toward the other jaw, in that there is a spring urging the movable jaw in a direction away from the other jaw and in that there is a fixed abutment positioned to be engaged by the movable jaw upon pivoting of the lever in response to a high pull-out force on the belt, thereby to move the movable jaw into engagement with the other jaw, at least one of the jaws having a multiplicity of closely spaced teeth lying transversely to the direction of movement of the belt, each tooth being of generally uniform cross section along its length in the transverse direction, and the other jaw having a multiplicity of recesses, each of which generally matches a corresponding tooth on the other jaw and receives such corresponding tooth and a widthwise strip of the belt upon engagement of the belt between the jaws, each such strip of the belt being formed into a smoothly curved loop by being tucked by a tooth into a corresponding recess of the other jaw and being gripped under pressure between opposed gripping surfaces of the teeth and recesses.

2. A belt clamp for a vehicle occupant restraint system which includes a restraint belt and a belt retractor onto and from which the belt is selectively wound and unwound and having a pair of jaws, one on either side of the belt, at least one of which is mounted to move toward and away from the other in response to a high pull-out force on the belt characterized in that at least one of the jaws has a multiplicity of closely spaced teeth lying transversely to the direction of movement of the belt, each tooth being generally straight, being of a length not less than the width of the belt, being smoothly curved in end profile, and being of lesser height in portions adjacent the edges of the jaw than in the center portion, and the other jaw having a multiplicity of recesses, each of which generally matches a corresponding tooth on the other jaw and receives such corresponding tooth and a widthwise strip of the belt upon engagement of the belt between the jaws, each such strip of the belt being formed into a smoothly curved loop by being tucked by a tooth into a corresponding recess of the other jaw and being gripped under pressure between opposed gripping surfaces of the teeth and recesses.

3. A belt clamp for a vehicle occupant restraint system which includes a restraint belt and a belt retractor onto and from which the belt is selectively wound and unwound and having a pair of jaws, one on either side of the belt, at least one of which is mounted to move toward and away from the other in response to a high pull-out force on the belt characterized in that at least one of the jaws has a multiplicity of closely spaced teeth lying transversely to the direction of movement of the belt, each tooth being generally straight, being of a length not less than the width of the belt, being smoothly curved in end profile, and being of maximum height at the center and of gradually reduced height moving from the center toward each side, and the other jaw having a multiplicity of recesses, each of which generally matches a corresponding tooth on the other jaw and receives such corresponding tooth and a widthwise strip of the belt upon engagement of the belt between the jaws, each such strip of the belt being formed into a smoothly curved loop by being tucked by a tooth into a corresponding recess of the other jaw and being gripped under pressure between opposed gripping surfaces of the teeth and recesses.

4. A belt clamp for a vehicle occupant restraint system which includes a restraint belt and a belt retractor onto and from which the belt is selectively wound and unwound and having a pair of jaws, one on either side of the belt, at least one of which is mounted to move toward and away from the other in response to a high pull-out force on the belt characterized in that at least one of the jaws has a multiplicity of closely spaced teeth lying transversely to the direction of movement of the belt, each tooth being generally straight, being of a length not less than the width of the belt, being smoothly curved in end profile, and being of generally uniform cross section along its length in the transverse direction, and the other jaw having a multiplicity of recesses, each of which generally matches a corresponding tooth on the other jaw and receives such corresponding tooth and a widthwise strip of the belt upon engagement of the belt between the jaws, the clamping surface of at least one of the jaws being transversely cambered, the teeth and recesses being concavely curved in a direction transverse to the axis of the belt to compensate for deflection of the jaw when the belt is clamped between the jaws, each such strip of the belt being formed into a smoothly curved loop by being tucked by a tooth into a corresponding recess of the other jaw and being gripped under pressure between opposed gripping surfaces of the teeth and recesses.

5. A belt clamp according to any of claims 1, 2, 3, or 4 and further characterized in that each recess in said other jaw is a generally straight elongated concavity having a length in the transverse direction of the belt not substantially less than the width of the belt and a generally uniform cross section along its length generally complementary to that of the corresponding tooth of said one jaw, such that each loop is clamped between the surfaces of each tooth and corresponding recess upon engagement of the belt between the jaws.

6. A belt clamp for a vehicle passenger restraint belt system comprising a frame having a pair of spaced-apart sides, a base and pair of jaws, the first jaw being fixedly mounted between the spaced-apart sides and adjacent the base; a roller having a corrugated surface slidably received in a pair of slots in the frame sides for movement between a releasing position and clamping position; a clamp member defining a second jaw movably mounted between the frame sides adjacent the roller and having a wedge surface which is corrugated and oblique to the path of the belt and engaged by the roller and coacting therewith such that the second jaw on the clamp member is wedged toward the fixed first jaw by the roller upon movement of the roller toward the clamping position; cooperating guide means on the clamp member and the frame for guiding the clamp member toward and away from the base in a direction oblique to the base, the clamp member being movable in a directon toward the release position of the roller at the same time that it moves away from the base; a spring urging the roller toward the release position; and the clamp member being urged in a direction toward the roller by the force of gravity, whereby both the clamp member and roller are normally urged toward releasing positions such that a belt led between the fixed first jaw and the second jaw on the clamp member and thence around the roller and away from the roller in a direction exerting a force on the roller in a direction toward the clamping position is free to move through the belt clamp, and whereby a high pull-out force on the belt shifts the roller toward the clamping position and clamps the belt between the fixed first jaw member and the second jaw on the clamp member by a combination of the wedging action of the clamp member and the guiding action of the guide means.

7. A belt clamp according to claim 6, wherein the clamp member is a lever pivotally mounted between the frame sides having a wedge surface oblique to the path of the belt, and further comprising a spring urging the lever toward the releasing position.

* * * * *